F. MAYR.
BUNG EXTRACTOR.
No. 180,357. Patented July 25, 1876.
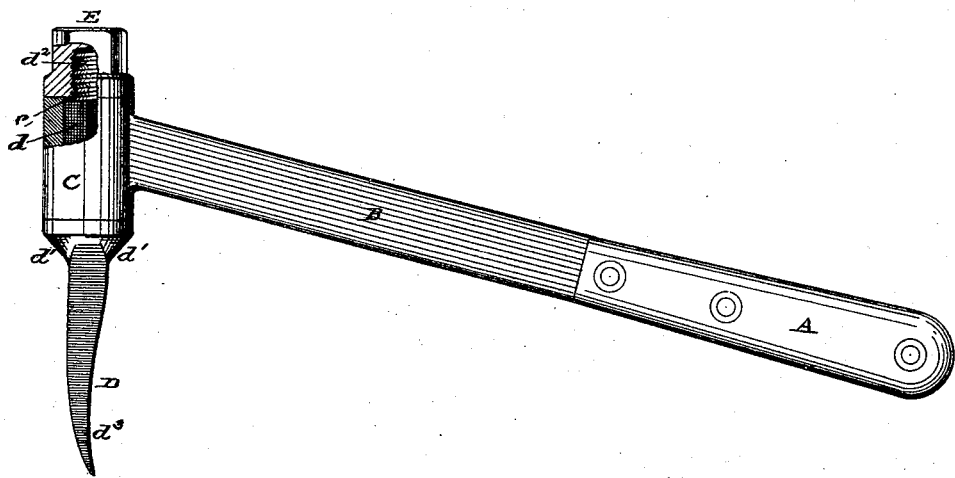
ATTEST:
Robert Burns.
Le Blond Burdett.
INVENTOR:
Fridolin Mayr
By Knight Bro's
Att'y.

UNITED STATES PATENT OFFICE.

FRIDOLIN MAYR, OF ST. LOUIS, MISSOURI.

IMPROVEMENT IN BUNG-EXTRACTORS.

Specification forming part of Letters Patent No. 180,357, dated July 25, 1876; application filed May 12, 1876.

*To all whom it may concern:*

Be it known that I, FRIDOLIN MAYR, of the city and county of St. Louis, and State of Missouri, have invented a certain new and useful Improvement in Bung-Extractors, of which the following is a full, clear, and exact description, reference being had to the accompanying drawing, making part of this specification.

My invention relates to a bung-extractor having a pick-point extending sidewise from the end of the haft or shank; and my improvement consists in making the point removable from a socket in the head of the instrument, the point being inserted and held in the socket as shown.

The drawing is a side view of the instrument, with parts of the head and nut broken away to show the shank of the point within.

A is the handle, and B the haft or shank. The shank is of metal, and the handle may be in one piece with the shank, or be of any other suitable material, secured to the shank in any usual or proper way. The socket-head C is in one piece with the shank, and is formed angularly with the shank. $c$ is a socket, passing through the head, to receive the shank $d$ of the pick-point D. This shank and socket are preferably made angular, so that the point cannot turn in its socket. The point D has a bearing-collar, $d^1$, which abuts against the lower end of the head C. At the upper end of the shank is a screw-threaded portion, $d^2$, on which screws a nut, E, that has bearing against the upper end of the head, and which thus holds the point in place.

The working end $d^3$ of the point is preferably curved, as shown, so as to take a fast hold of the bung when it has been engaged therewith, and the handle A is raised.

The point is the only part of a bung-extractor that is subject to wear or injury in use, and when this point is made in one piece with the shank the destruction of the point is the destruction of the whole instrument, and also in this form it is difficult for the smith to handle and work upon in sharpening; but the removable point may be easily sharpened by the blacksmith, and when it is worn out a new one can be substituted at a small cost, the shank B and head C remaining as good as new.

I claim—

The combination, in a bung-extractor, of the handle and shank A B, socket-head C, and removable point D, substantially as set forth.

FRIDOLIN MAYR.

Witnesses:
SAML. KNIGHT,
ROBT. BURNS.